(No Model.)
A. S. GLOVER.
APPARATUS FOR THE DISPOSAL OF SEWAGE.
No. 258,744. Patented May 30, 1882.
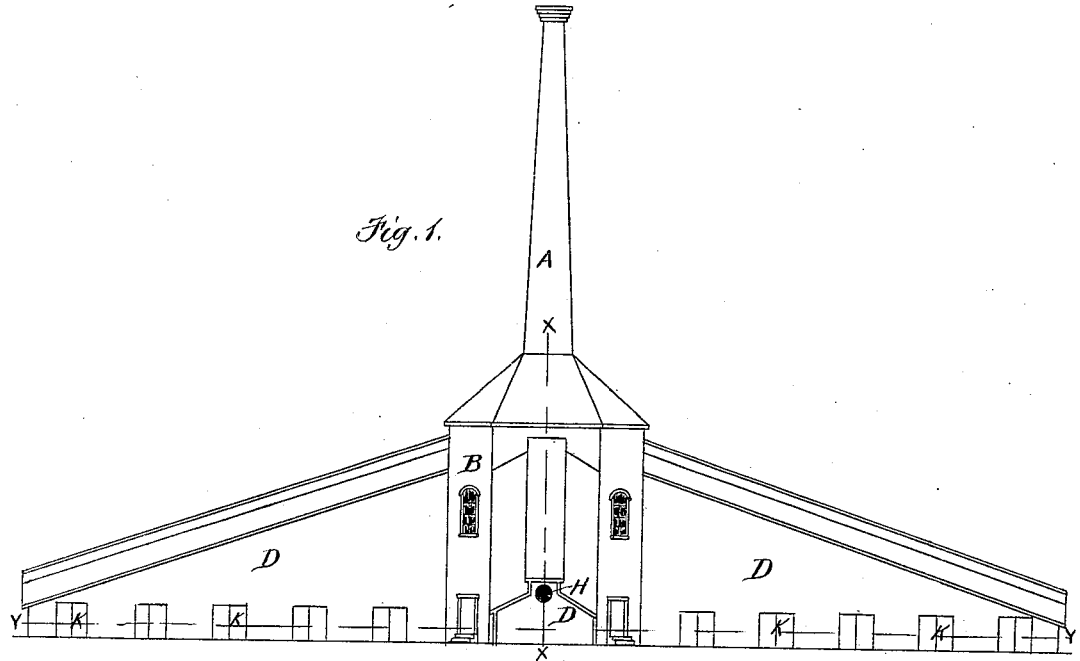
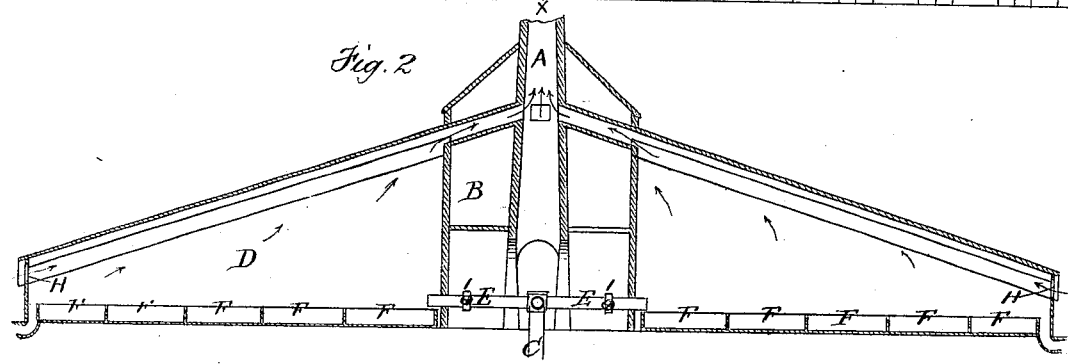
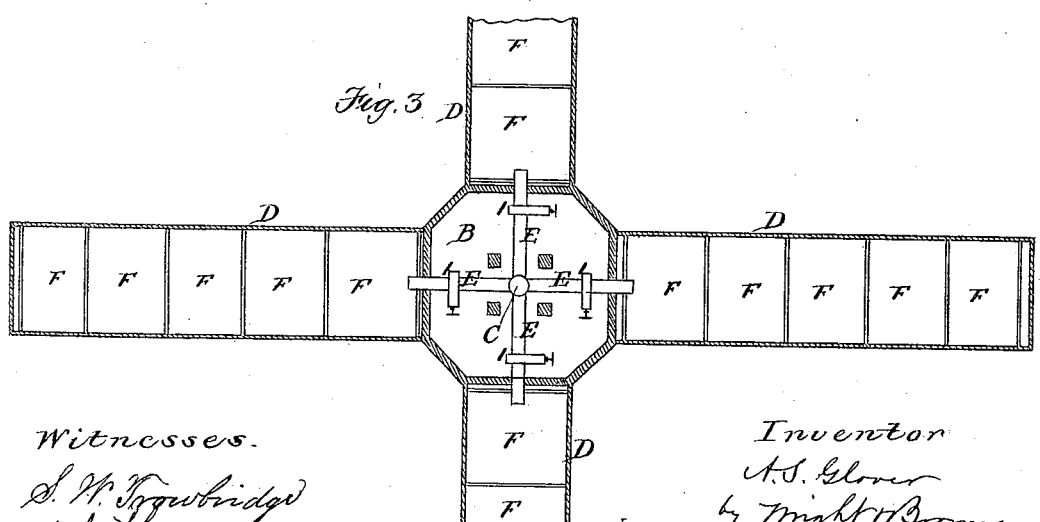
Witnesses.
S. W. Trowbridge
A. L. White
Inventor
A. S. Glover
by Wright & Brown
Attys.

United States Patent Office.

AMASON S. GLOVER, OF BROCKTON, MASSACHUSETTS.

APPARATUS FOR THE DISPOSAL OF SEWAGE.

SPECIFICATION forming part of Letters Patent No. 258,744, dated May 30, 1882.

Application filed October 15, 1881. (No model.)

*To all whom it may concern:*

Be it known that I, AMASON S. GLOVER, of Brockton, in the county of Plymouth and State of Massachusetts, have invented certain Improvements in Apparatus for the Disposal of Sewage, of which the following is a specification.

This invention has for its object to enable sewage matter to be disposed of without danger of contaminating the soil by matter in suspension, or the air by gases and odors.

The invention consists, first, in the combination of a series of tanks, a sewer main or pipe arranged to discharge sewage matter into the first tank of the series, from which said matter flows successively through the other tanks; a building or inclosure over said tanks, having an inclined roof forming a flue, having an opening at its lower end for the admission of external air, and a chimney connected to the upper end of said roof or flue, said chimney, flue, and opening causing a current of air to pass over the series of tanks to the chimney and carry with it from the building all the gases and odors arising from the matter in the tanks.

The invention also consists in an apparatus or building for the disposal of sewage, composed of, first, a central structure, receiving a sewer-main, and provided with a ventilating flue or chimney; and, secondly, a series of radiating wings or inclosures, each having a series of tanks adapted to receive sewage matter from the central structure, and an inclined roof or flue communicating with the central chimney and adapted to conduct to the chimney the gases and odors from the sewage matter in the tanks. Each wing is separated from the other wings, and means are provided for shutting off the sewage from either of the wings, so that when the tanks in either wing require cleaning out the work can be done without stopping the operation of the tanks in the other wings, all of which I will now proceed to describe.

Of the accompanying drawings in the specification, Figure 1 represents a side elevation of a building embodying my invention. Fig. 2 represents a section on line X X, Fig. 1. Fig. 3 represents a section on line Y Y, Fig. 1.

The same letters of reference indicate the same parts in all the figures.

In carrying out my invention I construct a chimney, A, of sufficient height to create a strong upward draft and carry gases and odors from sewage to a sufficient height to prevent them from being offensive. Around the base of said chimney I construct a building, B, into which at its base, enters a main sewer-pipe, C. Around the building B are a series of radiating buildings or wings, D, of any desired number. The main sewer-pipe C has several branches, E—one for each wing D. Each wing has a series of tanks, F, of any desired number, and the branch pipe E of each wing is arranged to discharge sewage matter from the main pipe into the first tank F, from which the sewage overflows into the succeeding tanks, the same water flowing through all the tanks in the series until it reaches the outer end of the wing, and depositing in each tank a portion of the matter held in suspension until it is comparatively free from such matter, and passes out from the last tank to the ground, or to a suitable conduit, in a practically pure condition. The roof of each wing D is inclined upwardly from the outer end to the main building and communicates with the chimney A, as shown in Fig. 2, so that it constitutes an inclined flue, which conducts all gases and odors from the sewage matter in the tanks to the chimney. Each wing D is provided with an opening, H, at its outer end under the roof to permit the entrance of air to facilitate the passage of the gases and odors to the chimney, otherwise the wings are made as nearly air-tight as possible. The branches E, which conduct the sewage matter to the wings D, are provided with suitable valves or gates, I, so that the flow of sewage to either wing can be shut off when it is desired to remove the deposits of solid matter from the tanks of such wing. In practice, when the described works are constructed on a large scale, capable of disposing of the sewage of a city or town, the wings will be shut off one at a time to be cleaned, the disposal of sewage going on at the same time in the other wings. Each wing is provided with doors K, for the removal of the matter from the tanks.

If desired, the chimney may be provided with apparatus for consuming the gases and ordors by heat.

The heating apparatus may be caused to warm the interior of the building B to prevent the sewage matter from freezing in the branch pipes E.

I am aware that sewage has been caused to flow through a series of tanks, depositing in each a portion of the matter held in suspension; but I am not aware that such tanks have ever been covered by a structure having an inclined roof or flue leading to a chimney, whereby all offensive odors and noxious gases are sufficiently removed as to be harmless.

I claim as my invention—

1. In an apparatus for the disposal of sewage, the combination of a series of tanks, a sewer main or pipe arranged to discharge sewage matter into the first tank of the series, from which said matter flows successively through the other tanks, a building or inclosure over said tanks, having an inclined roof forming a flue having an opening, H, at its lower end for the admission of external air, and a chimney, A, connected to the upper end of said roof or flue, said chimney, flue, and opening causing a current of air to pass over the series of tanks to the chimney and carry with it from the building all the gases and odors arising from the matter in the tanks, as set forth.

2. The improved apparatus or building for the disposal of sewage, consisting of, first, a central structure receiving a sewer-main, and provided with a ventilating flue or chimney; and, secondly, radiating wings or inclosures, each having a series of tanks adapted to receive sewage matter from the central structure, and an inclined roof or flue communicating with the central chimney and adapted to conduct to the chimney the gases and odors from the sewage matter in the tanks, the central structure being provided with means for shutting off the sewage from either of the wings whenever the tanks require cleaning, as set forth.

In testimony whereof I have signed my name to this specification, in the presence of two subscribing witnesses, this 12th day of October, A. D. 1881.

A. S. GLOVER.

Witnesses:
ARTHUR P. HAZARD,
ISAAC H. HARRIS.